May 29, 1951 — F. A. ZAENKERT — 2,555,072
AUTOMATIC CARCASS LANDING DEVICE

Filed Feb. 12, 1947 — 2 Sheets-Sheet 1

INVENTOR.
FREDERICK A. ZAENKERT
BY Allen & Allen
ATTORNEYS.

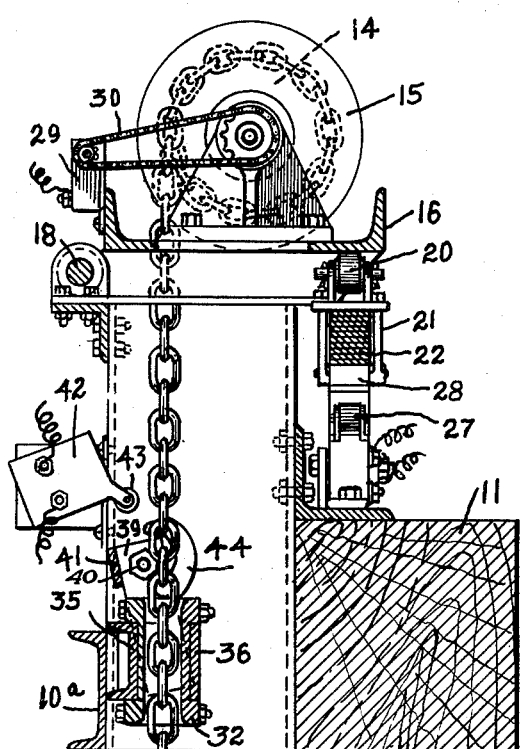

Patented May 29, 1951

2,555,072

UNITED STATES PATENT OFFICE 2,555,072

AUTOMATIC CARCASS LANDING DEVICE

Frederick A. Zaenkert, Green Hills, Ohio, assignor to The Cincinnati Butchers' Supply Corporation, Cincinnati, Ohio, a corporation of Ohio Application February 12, 1947, Serial No. 727,967

11 Claims. (Cl. 214—95)

This invention relates to an automatic landing device for use in slaughter houses in the processing of cattle.

After the animal has been killed and is ready for further processing it is desirable to suspend it upon some sort of conveying means so that it can be moved as needed from one situation to another with relative ease. It has been usual in slaughter houses to provide a monorail and a carrier having a roller adapted to ride on the monorail to which the carcass could be attached. Usually a hoist of some sort has been provided for the purpose of raising the carrier and the attached carcass from the floor up to the level of the monorail and to place the roller of the carrier upon said rail so that the carcass could easily be moved.

Considerable difficulty has always been had in placing the roller of the carrier upon the rail, and while various means and procedures have been devised for accomplishing this step, none has been thoroughly satisfactory.

It is an object of my present invention, therefore, to provide a device by means of which a carcass may have attached to it a carrier having a roller and whereby the carrier with its attached carcass may be raised up off the floor, and whereby the carrier will be automatically positioned for placement upon the monorail. It is another object of my invention to provide a device as outlined above which will be sturdy and yet which will be relatively simple in construction and operation. A further object of my invention is to provide a particular form of carrier which will be particularly adapted for the purpose described above. A still further object of my invention is the provision of means whereby the operation of the device is largely automatic.

These and other objects of my invention which will be pointed out more in detail hereinafter or which will be apparent to one skilled in the art upon reading these specifications I accomplish by that certain construction and arrangement of parts of which I shall now describe an exemplary embodiment.

Reference is made to the drawings forming a part hereof and in which Figure 1 is a front elevational view of a device according to my invention.

Figure 3 is a cross-sectional view taken on the line 3, 3 of Figure 1.

Figures 4, 5 and 6 are fragmentary views similar to Figure 3 showing successive positions of the carrier in the operation of the device, and Figure 7 is a perspective view of the guide block for the hoist chain.

Figure 1:
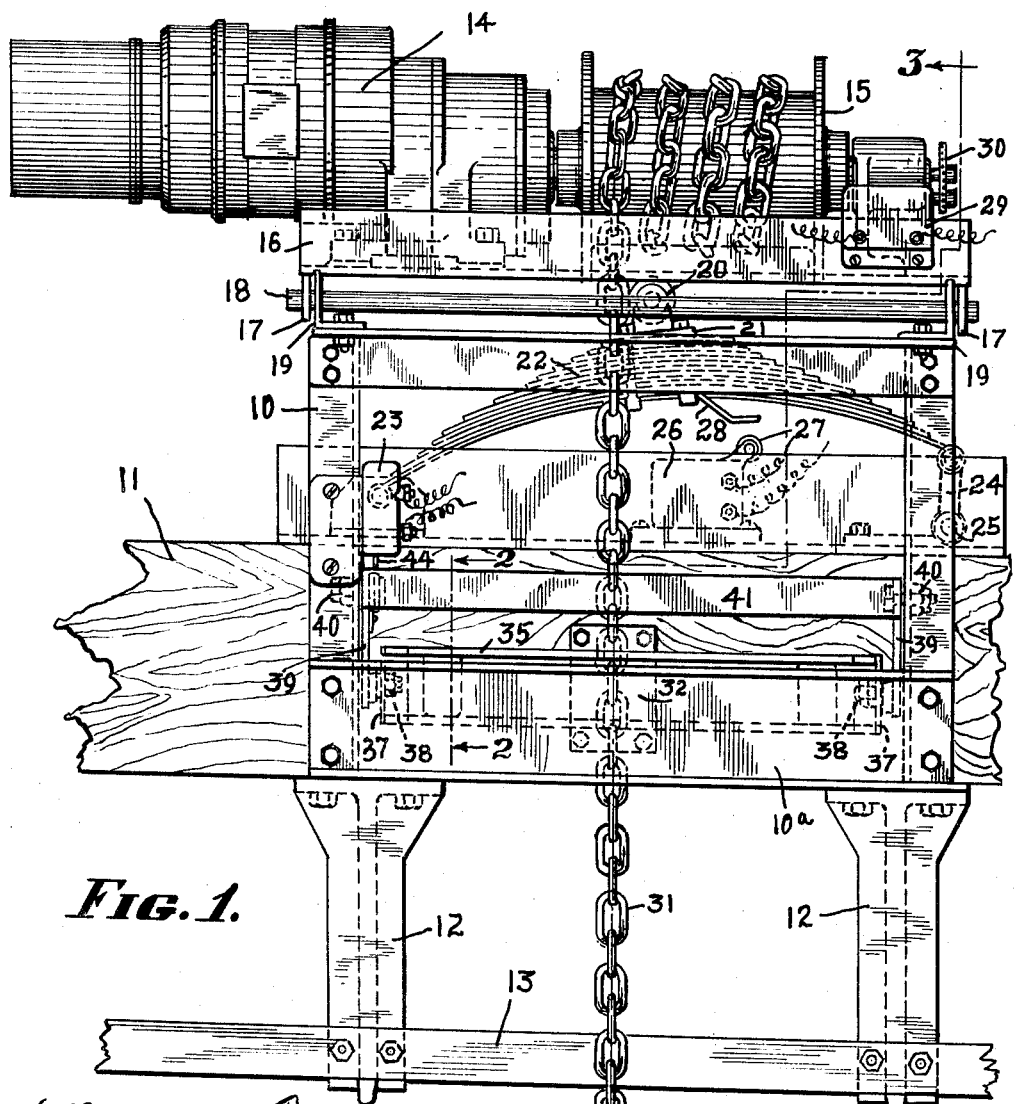
Figure 2:
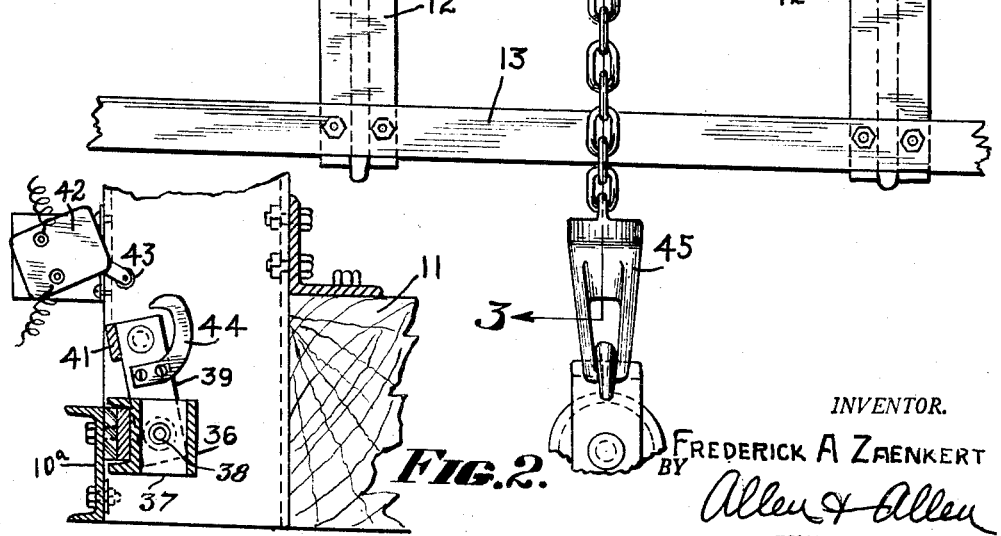
Figure 2 is a partial cross-sectional view taken on the line 2, 2 of Figure 1.

Briefly in the practice of my invention I provide a framework generally indicated at 10 which may be fastened to a part of the slaughter house structure indicated generally at 11. Attached to the bottom of the structure 11 as by means of brackets 12 is the monorail 13.

A hoist mechanism comprising driving means indicated generally at 14 and a drum 15 are mounted on a platform 16 having depending ears 17 by means of which it is mounted on a rod 18 carried in brackets 19 on the frame 10. In the rear of the device or at the right as seen in Figure 3, the platform 16 is supported upon a roller 20 which is mounted by means of a clamp structure 21 upon a leaf type spring 22. The spring 22 is mounted at one end by a shackle 23 and at its other end to an end of the link 24 which is pivotally mounted as at 25.

A limit switch is provided at 26 having an element 27 arranged to be contacted by an element 28 fixed to the clamping structure 21.

From the foregoing it will be noted that the driving means and drum are mounted upon a yielding platform so that under an excessive load the spring 22 will be flattened to a point where the member 28 contacts the member 27 to shut off the motor. This it will be understood is a safety measure and under normal conditions the elements 27 and 28 will not come into contact.

A limit switch is also provided at 29 and is driven by means of a sprocket 30 from the drum 15. This limit switch serves to stop the motor after a predetermined number of unwinding turns.

Fixed to the drum 15 and arranged to be wound up thereon is a chain 31. The chain passes through a guide block 32 most clearly seen in Figure 7. The block may consist of two pieces bolted together as shown and having a cross-shaped bore therethrough as indicated at 33 to permit passage of the chain 31. The guide block is provided with the slots or grooves 34 upon opposite faces which engage the channel 35 and plate 36 as most clearly seen in Figures 3 and 5. It may be noted that as the chain is wound up or unwound from the drum 15 whereby the locus of the chain is moved right and left in the plane of the paper in Figure 1 the block 32 can slide back and forth along the channel 35 and plate 36.

At their ends the channel 35 and plate 36 are connected by the plates 37 which are provided with holes for the passage of studs 38. Arms 39 are pivoted in the frame 10 as by means of bolts 40 and are connected together by a bar 41 which may be welded thereto in order to maintain the two arms 39 always parallel.

From the foregoing it may be observed that the entire structure including the arms 39 and plate 41, channel 35, plate 36 and the block 32 may pivot about the pivots 40 and that the structure comprising the channel 35, plate 36 and block 32 together with the end plates 37 can pivot about the bolts 38.

A limit switch is provided at 42 having a contact element 43 and one of the arms 39 has fixed to it a cam 44.

The chain 31 has fastened to its end an eye member 45 which is, of course, too large to pass through the opening 33 in the guide block 32 so that during a hoisting operation when the member 45 contacts the block 32 through which it cannot pass, the block together with the channel and plate in which it is guided is caused to swing counter-clockwise as seen in Figure 3 in an arc about the pivot 40 until the parts reach the position of Figure 5 where the rise in the cam 44 causes the limit switch 42 to operate to stop the hoist. It will be noted by comparison of Figures 3 and 5 that the chain 31 normally has a locus in a plane removed from the plane of the monorail 13, but that as a result of the movement described above the chain is deflected from its normal locus to the position of Figure 5.

Clockwise movement of the above described structure is limited by the bumper channel 10a which is a part of the framework 10.

The carrier which is shown in several of the figures is indicated generally at 46 and is provided at the bottom with a hook or the like 47 to which a carcass may be attached. At its upper end the member 46 is provided with an inverted U- bend to provide bearings for the roller 47a, which is adapted to ride upon the rail 13. At its upper end the member 46 is also provided with the tapered, non-reentrant hook 48 which is adapted to be engaged in the eye 45. Just below the roller 47 the member 46 is provided with a projection or cam surface 49 to assist in guiding the carrier onto the rail.

In operation the switches are so set and the various arms and other parts so dimensioned and positioned that the eye 45 engages the block 32 at a point where the roller 47 is almost at the level of the rail so that during the arcuate movement toward the right of Figures 3 to 6, the lower edge of the roller will be more or less dragged across the rail as clearly shown in Figure 4 so as to arrive at the position of Figure 5 at the time that the limit switch 42 cuts off the hoist. It will now be seen that the roller 47 is just above the rail 13 and that the cam surface 49 is also just above the rail 13. If the hoist is now set into motion in a reverse direction, the cam surface 49 serves to guide the carrier and the wheel 47 into position on the rail 13 during the first instant of downward movement of the chain. During further downward movement of the chain, of course, the arms 39 swing in a clockwise direction to permit the chain to return to its normal locus and during this movement the eye 45 simply slips off the hook 48 by gravity leaving the carrier properly positioned upon the monorail.

Normal controls are, of course, provided (not shown) for starting the hoisting motor in one direction or the other.

It will be clear that numerous modifications may be made in my invention without departing from the spirit thereof. For example, a cable or a rope could readily be substituted for the chain without difficulty. I, therefore, do not intend to limit myself in any manner except as pointed out in the claims which follow.

Having now fully described my invention what I claim as new and desire to secure by Letters Patent is:

1. A device for hoisting a load and depositing it on an elevated monorail, comprising a carrier attachable to said load, said carrier having a flanged roller adapted to ride on said monorail and a hook by means of which it may be lifted, a hoist having a flexible hoisting element provided with an eye for engaging said hook, said flexible hoisting element being normally disposed in a plane removed from the plane of said monorail, and a pivoted guide block for said flexible element operative when said carrier has been lifted substantially to the level of said monorail for deflecting said flexible element from its normal locus to bring said carrier to a position in which said roller is directly over said monorail, whereby upon initial reverse movement of said hoist, said roller is deposited on said monorail, and said eye becomes disengaged from said hook by gravity.

2. A device according to claim 1, in which said hook is non-reentrant to facilitate said disengagement.

3. A device according to claim 1, in which said guide block is provided with an opening through which said flexible element passes, said block being mounted for movement on an arc upwardly and toward said monorail, and said eye being of a size which will not pass through said block, whereby when said eye abuts said block, said block is caused to move in its arcuate path upon further movement of said hoist.

4. A carrier according to claim 1, in which said second mentioned hook is downwardly disposed and is non-reentrant, to facilitate its disengagement.

5. A device according to claim 8 in which said guide block is slidably mounted for lateral movement.

6. A device according to claim 1 in which said guide block is slidably mounted for lateral movement.

7. A device according to claim 3 in which said guide block is slidably mounted for lateral movement.

8. A device for hoisting a load and depositing it upon an elevated monorail, comprising a carrier attachable to said load, said carrier having a roller adapted to ride on said monorail and an element by means of which it may be lifted, a hoist having a flexible hoisting element provided with means for engaging said element on said carrier, said flexible hoisting element being normally disposed in a plane removed from the plane of said monorail, and a guide block operative when said carrier has been lifted substantially to the level of said monorail for deflecting said flexible element from its normal locus to bring said carrier to a position in which said roller is directly over said monorail, whereby upon initial reverse movement of said hoist, said roller is deposited on said monorail and said engaging means and elements become disengaged by gravity, said guide block having an opening through which said flexible hoisting element passes, said block being mounted pivotally on an arm which is pivotally mounted on said device, said flexible hoisting means having adjacent the end to which said carrier is attached a stop which will not pass through said block, whereby when said stop abuts said block, said block and arm will pivot about the pivot on said device during the terminal movement of said hoist, thereby displacing said flexible element from its normal locus.

9. A device for hoisting a load and depositing it upon an elevated monorail, comprising a carrier attachable to said load, said carrier having a roller adapted to ride on said monorail and an element by means of which it may be lifted, a hoist having a flexible hoisting element provided with means for engaging said element on said carrier, said flexible hoisting element being normally disposed in a plane removed from the plane of said monorail, and a guide block operative when said carrier has been lifted substantially to the level of said monorail for deflecting said flexible element from its normal locus to bring said carrier to a position in which said roller is directly over said monorail, whereby upon initial reverse movement of said hoist, said roller is deposited on said monorail and said engaging means and element become disengaged by gravity, said guide block having an opening through which said flexible hoisting element passes, said block being mounted pivotally on an arm which is pivotally mounted on said device, said flexible hoisting means having adjacent the end to which said carrier is attached a stop which will not pass through said block, a contact member on said arm, a limit switch for said hoist on said device having a contact member, said members being so adjusted that when said stop abuts said block, said block and arm will pivot about the pivot on said device until said hoist is stopped by contact between said contact members at which point said roller is positioned directly over said monorail.

10. A device for hoisting a load and depositing it upon an elevated monorail, comprising a carrier attachable to said load, said carrier having a roller adapted to ride on said monorail and an element by means of which it may be lifted, a hoist having a flexible hoisting element provided with means for engaging said element on said carrier, said flexible hoisting element being normally disposed in a plane removed from the plane of said monorail, and a guide block operative when said carrier has been lifted substantially to the level of said monorail for deflecting said flexible element from its normal locus to bring said carrier to a position in which said roller is directly over said monorail, whereby upon initial reverse movement of said hoist, said roller is deposited on said monorail and said engaging means and element become disengaged by gravity, said guide block being slidably mounted for lateral movement.

11. A device for hoisting a load and depositing it upon an elevated monorail, comprising a carrier attachable to said load, said carrier having a roller adapted to ride on said monorail and an element by means of which it may be lifted, a hoist having a flexible hoisting element provided with means for engaging said element on said carrier, said flexible hoisting element being normally disposed in a plane removed from the plane of said monorail, and a movable guide block operative when said carrier has been lifted substantially to the level of said monorail for deflecting said flexible element from its normal locus to bring said carrier to a position in which said roller is directly over said monorail, whereby upon initial reverse movement of said hoist, said roller is deposited on said monorail and said engaging means and element become disengaged by gravity, said guide block being disposed in a vertical plane substantially removed from the vertical plane of said monorail when said flexible element is in its normal locus.

FREDERICK A. ZAENKERT.

REFERENCES CITED

The following references are of record in the file of this patent:

UNITED STATES PATENTS

| Number | Name | Date |
|---|---|---|
| 331,758 | Barrett | Dec. 8, 1885 |
| 337,179 | McArdle | Mar. 2, 1886 |
| 886,417 | Schmidt et al. | May 5, 1908 |
| 975,806 | Terril et al. | Nov. 15, 1910 |
| 1,828,603 | Holley | Oct. 30, 1931 |
| 2,159,623 | Schmidt | May 23, 1939 |
| 2,401,942 | Le Fiell | June 11, 1946 |